US006603582B1

(12) United States Patent
Cotte et al.

(10) Patent No.: US 6,603,582 B1
(45) Date of Patent: Aug. 5, 2003

(54) HIGH RESOLUTION DEVICE FOR DIGITIZING LARGE SIZE DOCUMENTS

(75) Inventors: Pascal Cotte, Morsang sur Orge (FR); Marcel Dupouy, Paris (FR)

(73) Assignee: Lumiere Technology, Paris (FR)

( * ) Notice: Subject to any disclaimer, the term of this patent is extended or adjusted under 35 U.S.C. 154(b) by 0 days.

(21) Appl. No.: 09/806,583

(22) PCT Filed: Oct. 13, 1999

(86) PCT No.: PCT/FR99/02472

§ 371 (c)(1),
(2), (4) Date: Apr. 2, 2001

(87) PCT Pub. No.: WO00/25509

PCT Pub. Date: May 4, 2000

(30) Foreign Application Priority Data

Oct. 23, 1998 (FR) .............................. 98 13291

(51) Int. Cl.⁷ ................................. H04N 1/04
(52) U.S. Cl. .................. 358/474; 358/496; 358/486
(58) Field of Search ................. 358/474, 475, 358/498, 488, 486, 493, 494, 496, 302

(56) References Cited

U.S. PATENT DOCUMENTS

| | | | |
|---|---|---|---|
| 4,256,959 A | | 3/1981 | Monette ..................... 280/235 |
| 4,422,100 A | | 12/1983 | DuVall et al. .............. 358/293 |
| 4,459,618 A | | 7/1984 | Nodov ........................ 358/293 |
| 4,667,255 A | | 5/1987 | Lindberg .................... 358/293 |
| 4,767,927 A | * | 8/1988 | Ohyama .................. 250/327.2 |
| 4,835,386 A | * | 5/1989 | Shimura .................. 250/327.2 |
| 4,857,732 A | * | 8/1989 | Shimura .................. 250/327.2 |
| 4,873,708 A | * | 10/1989 | Cusano ................. 250/370.09 |
| 4,910,601 A | | 3/1990 | Gerlach ..................... 378/474 |
| 5,084,611 A | * | 1/1992 | Okisu ....................... 250/208.1 |
| 5,430,289 A | * | 7/1995 | Erickson .................... 250/205 |
| 5,516,094 A | * | 5/1996 | Sander ....................... 271/259 |
| 5,625,183 A | | 4/1997 | Kashitani et al. ........... 280/236 |
| 5,747,825 A | * | 5/1998 | Gilblom .................... 250/586 |
| 5,764,379 A | * | 6/1998 | Matsuda .................... 358/474 |
| 5,805,272 A | * | 9/1998 | Nozawa ...................... 355/25 |
| 5,895,928 A | * | 4/1999 | Kerschner .............. 250/599.37 |
| 5,978,102 A | * | 11/1999 | Matsuda .................... 358/474 |

FOREIGN PATENT DOCUMENTS

| | | | | |
|---|---|---|---|---|
| DE | 0068431 | * | 6/1982 | ......... G01B/11/24 |
| EP | 0599481 A1 | * | 6/1994 | ........... H04N/1/10 |

* cited by examiner

Primary Examiner—Jerome Grant, II
(74) Attorney, Agent, or Firm—Nixon & Vanderhye P.C.

(57) ABSTRACT

The document (12) is placed on a plane support (14) defining an object plane. The apparatus (10) includes a camera (16) situated at a distance from the document, and having an objective lens system forming an image of the document on an image plane. The camera has a photosensitive sensor scanning a line of the image plane in a first direction, and first motor means suitable for moving the sensor in controlled manner in a second direction that is distinct from the first in such a manner as to sweep the surface of the image plane in said second direction. At least one light generator (20) is also provided suitable for forming a narrow strip of light (36) on the object plane and oriented parallel to said first direction, the generator also including second motor means suitable for moving the strip of light in controlled manner so as to sweep the surface of the object plane parallel to said second direction. Servo-control means provide servo-control between the first and second motor means so as to ensure that the scan line in the image plane coincides with the strip of light on the object plane.

5 Claims, 3 Drawing Sheets

FIG_1
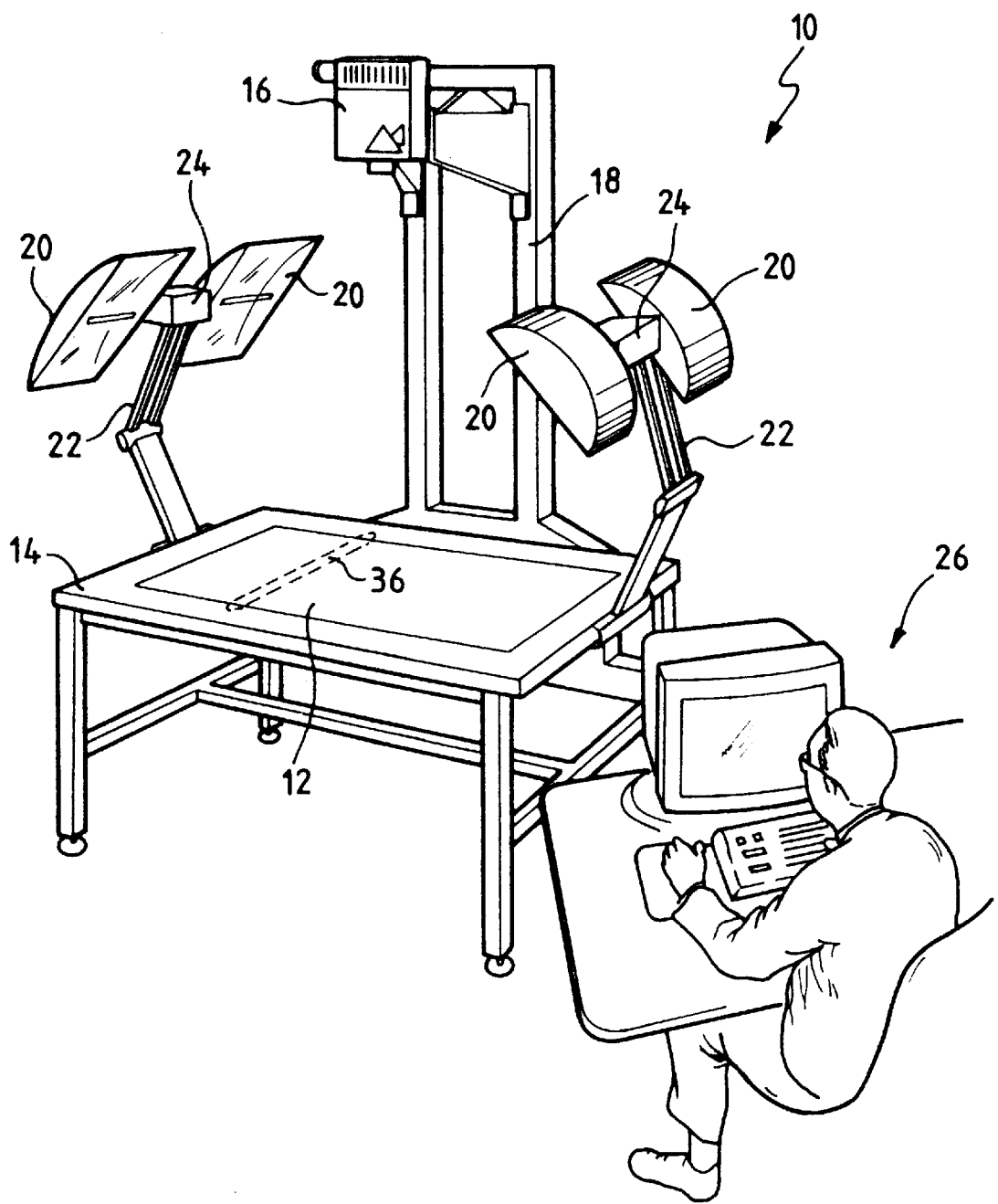

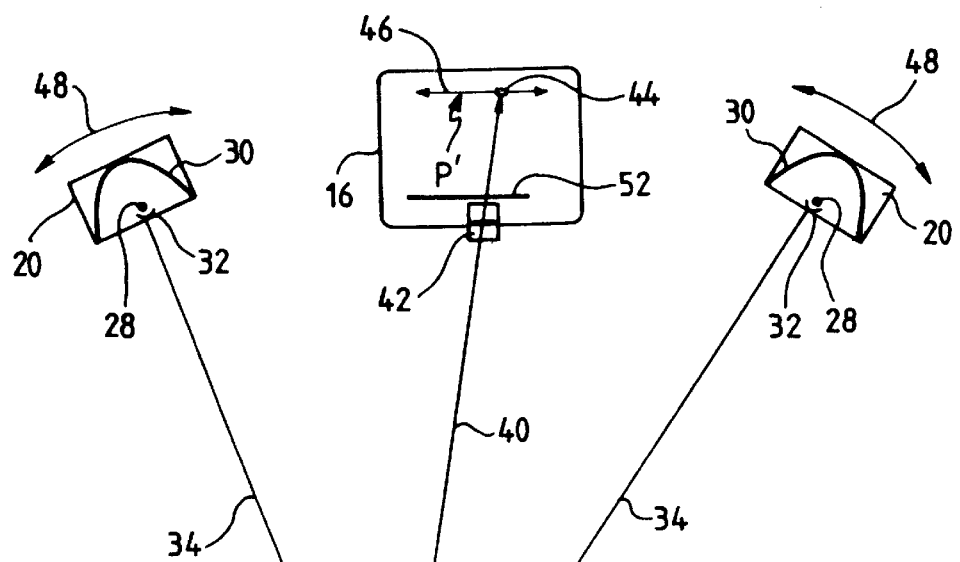
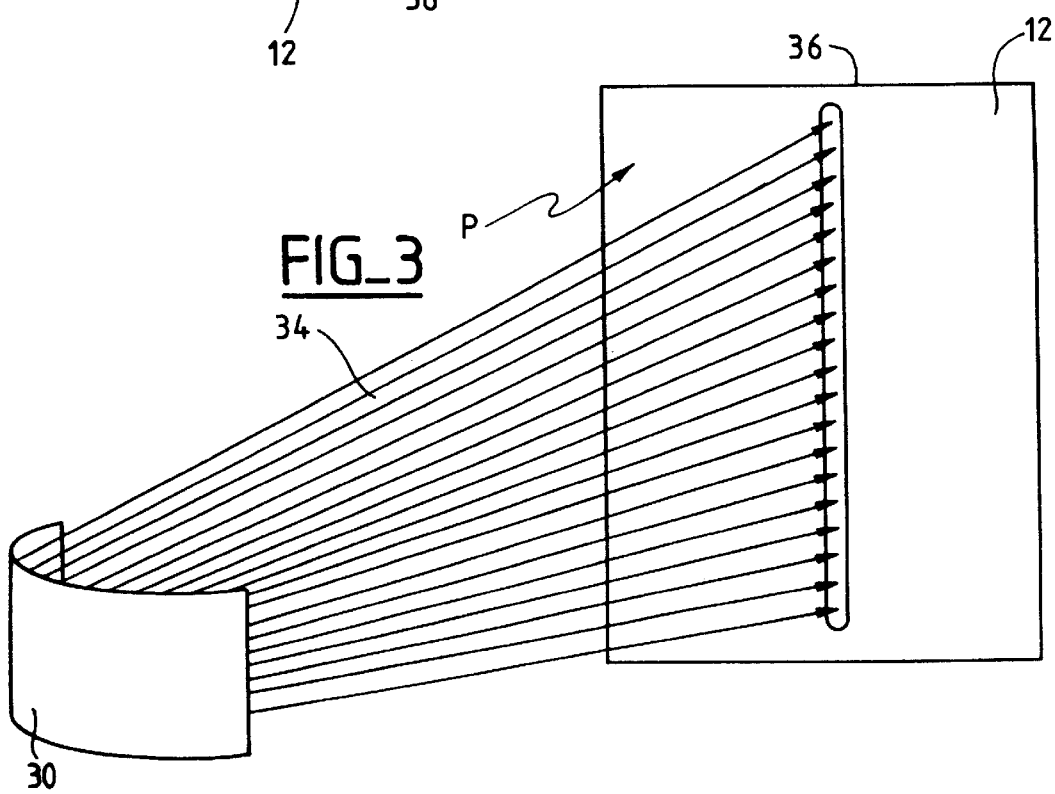

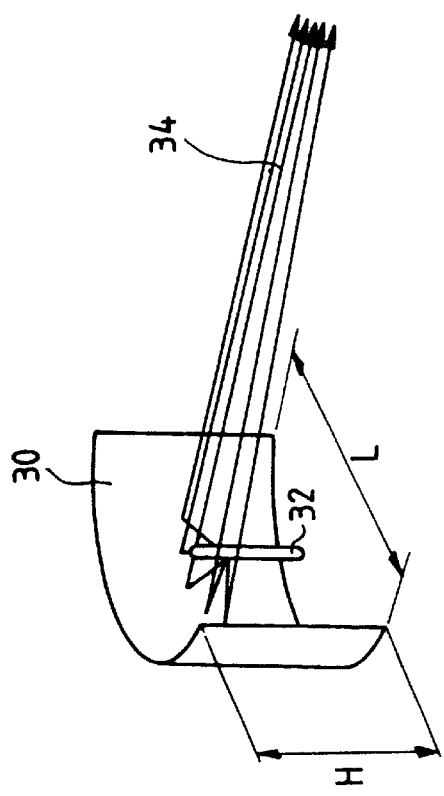
FIG_4
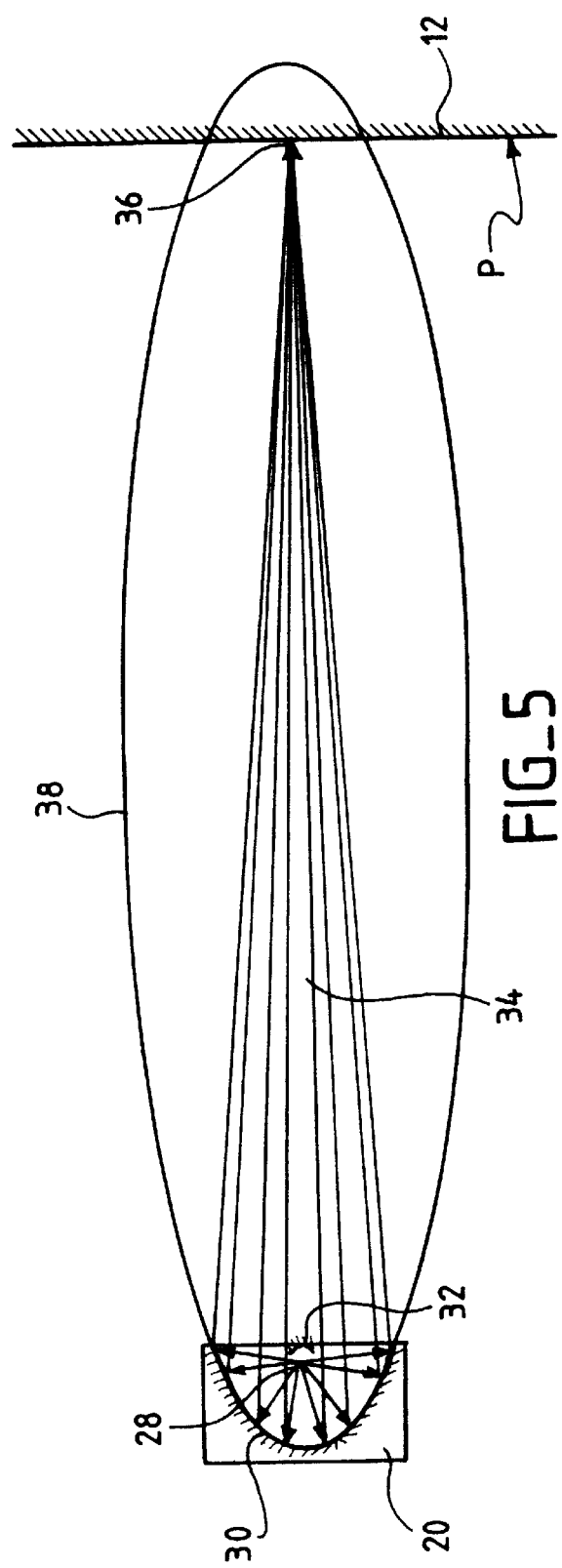
FIG_5

HIGH RESOLUTION DEVICE FOR DIGITIZING LARGE SIZE DOCUMENTS

The present invention relates to scanning documents of large dimensions (or flat articles presenting little relief) at high resolution in order to enable them to be stored digitally in a computer system for subsequent archiving, consultation, reproduction, dissemination, or processing.

Until now, paper plans of large dimensions have been scanned using plan scanners, however they suffer from various limitations and drawbacks:

firstly, the maximum size of documents that can be scanned, which size is limited to standardized A0 format (840 millimeters (mm)×1288 mm) for the largest devices available; and scanning time which is of the order of 5 minutes for an A0 document, which time is prohibitive when a large corpus of documents are to be scanned, typically several thousands or several tens of thousands of paper plans.

One solution for scanning documents of size greater than A0 format consists in photographing the document by means of a large-format camera and in scanning the silver-based image obtained in this way using a photograph scanner.

That solution does indeed make it possible to mitigate the drawback of the limit on dimensions, however it is relatively impractical to implement and very expensive, and in addition it involves a large amount of handling time.

An object of the invention is to mitigate those various drawbacks by proposing document scanner apparatus which makes it possible simultaneously:

to accept documents of very large dimensions, significantly greater than A0 (it is shown below that it is easy to reach dimensions of 2000 mm×3334 mm);

to produce very high resolution in the scanned image, typically of the order of 0.1 mm in the document to be reproduced;

to be very fast in use (typically requiring a few seconds or at most a few tens of seconds per document);

to deliver information that is directly in digital form and usable by a computer system without making use of a silver-based medium or some equivalent intermediary; and to be capable of producing documents at will either with a gray scale, or as lines at higher resolution, or in color.

The invention is thus particularly suited to very high resolution scanning of a large corpus of paper documents where the documents are both large or very large in dimension and are present in very large numbers, such as collections of old maps which it is desired to have in digital form.

Furthermore, unlike plan scanners which are limited to reproducing documents that are made of paper and that are in good condition (so as to allow a document to be fed properly), the invention is applicable to reproducing paper documents that are in poor condition, have been retouched, corrected, repaired, or indeed to reproduce documents that are thick or articles that are flat but present little relief, or documents or articles that are fragile, insofar as reproduction takes place without physical contact with the document or article to be reproduced, as described below.

To achieve these objects, it is necessary to overcome difficulties associated simultaneously with the very high resolution required and the large dimensions of the documents in question which, as mentioned above, can be as great as a format of 3 meters (m)×4 m, or even greater.

In particular, high resolution requires significant lighting of the document or article to be scanned if desired quality is to be obtained in reasonable time.

If the entire surface to be reproduced is illuminated uniformly with the appropriate light flux, (about 200,000 lux) then various drawbacks will be encountered such as:

poor contrast because the optical system and the reproduction chamber are dazzled by the light flux;

high levels of power consumption, about 50 kilowatts (kW) with the corresponding need to air condition the working premises given the considerable amount of heat generated; and difficulty in obtaining lighting that is properly uniform over the work surface, thus making it necessary to increase the number of light sources, thereby giving rise to equipment that is relatively bulky.

Essentially, the invention proposes inputting an image by sweeping a narrow line constituted by a large number of light-sensitive points over the image plane inside a camera, and instead of illuminating the entire document, illuminating only a narrow strip in the object plane on either side of the line currently being scanned.

More precisely, the invention provides document-scanning apparatus in which a document is placed on a plane support defining an object plane, and including a camera situated at a distance from the document, the camera including an objective lens system forming an image of the document on an image plane, and the apparatus being characterized in that:

the camera includes a photosensitive sensor for scanning a line of the image plane in a first direction;

the camera includes first motor means adapted to move the sensor in controlled manner in a second direction that is distinct from the first, so as to sweep over the surface of the image plane in said second direction;

at least one light generator is provided that is suitable for forming a narrow strip of light in the object plane and extending parallel to said first direction;

the light generator includes second motor means suitable for displacing the light strip in controlled manner so as to sweep over the surface of the object plane parallel to said second direction; and servo-control means are provided for providing servo-control between the first and second motor means to keep the scan line in the image plane in correspondence with the light strip in the object plane.

This technique presents various advantages, such as:

improved contrast (and thus improved final resolution) by not dazzling the optical system and the apparatus as a whole due to light flux corresponding to zones remote from the line currently being scanned;

energy saving, typically by a factor of about ten to about fifty compared with lighting the entire document;

no need to air-condition the working premises because less power is consumed;

greater ease in obtaining good uniformity of lighting over the work surface; and reduced bulk compared with traditional lighting systems.

The preferred means for obtaining a narrow strip of lighting consists in providing a line generator that comprises a linear light source and a reflector in the form of a portion of an elliptical cylinder, said cylinder being defined by a director line parallel to the linear light source and by an elliptical generatrix having one of its focuses situated at the linear light source and its other focus situated in the object plane.

Amongst other things, the servo-control means can be:

cam and linkage mechanical means associating the position of the light generator with the position of the sensor; or electronic means comprising means for determining the instantaneous position of the sensor and means for driving said second motor means in such a manner as to associate the position of the light generator with that of the sensor; or optoelectronic means comprising means that are movable synchronously with the sensor to generate a laser beam and to project said beam on the object plane in the vicinity of the document, with distance-measuring means monitoring the respective positions of the spot formed by the beam on the object plane and the light strip and driving said second motor means in such a manner as to cause the position of the light generator to be associated with the position of the sensor.

An embodiment of the invention is described below with reference to the accompanying drawings.

FIG. 1 is an overall view of apparatus of the invention showing the various elements thereof.

FIG. 2 is a diagrammatic elevation view showing the principle on which the invention operates.

FIGS. 3 and 4 are perspective views, respectively a rear and a front three-quarter view, showing a portion of the elliptical reflector and the light source, showing how the beam is formed.

FIG. 5 is a plan view showing the configuration of the various elements of the optical system used by the invention.

FIGS. 1 and 2 show the various elements constituting the apparatus of the invention.

The apparatus 10 is for reproducing a document (or more generally a flat article presenting little relief) referenced 12 which, in this configuration is placed on a table 14 which is surmounted by a camera 16 on a frame 18. Light generators 20 which are described in greater detail below (four of them in this case) are disposed on either side of the document 12 and are fixed to the table 14 by arms 22 together with hinged and motor-driven links 24.

The apparatus as a whole is controlled by a computer workstation 26 which ensures that the various elements operate in concert and which recovers the scanned data.

The configuration shown in FIG. 1 corresponds to a typical reproduction bench, however it is not limiting and could be adapted as a function of the dimensions and the nature of the documents to be reproduced.

Thus, for documents of very large dimensions, it is possible to suspend the camera 16 from the ceiling together with the light generators 20 (since in order to reproduce documents placed on a table and having a format of the order of 3 m×4 m, the distance required between the object plane and the image plane is about 4 m). In order to ensure that the document is indeed plane, it is also desirable to use a suction table.

Another solution consists in suspending the document vertically instead of laying it out horizontally. The camera 16 is then placed on a tripod and the motor-driven light generators 20 extend vertically at either side of the apparatus. To hold the document in place and to keep it plane, it is highly desirable in this case likewise to make use of a (vertical) suction plate.

In the preferred embodiment, the light generators 20 as shown in FIGS. 2 to 5 comprise a linear light source 28, e.g. the filament of a tubular light bulb. This source is associated with a reflector 30 in the form of a portion of an elliptical cylinder whose director lines are parallel to the linear filament of the source 28 and whose generatrix is an ellipse having one of its focuses situated at the linear filament of the source 28. Advantageously, a front cap 32 is provided in the form of a circular cylinder to reflect light rays which would otherwise have escaped the main mirror back towards the reflector 30 so as to increase the efficiency of the system.

The light generator 20 produces a light beam 34 which produces a narrow rectilinear strip of light 36 on the plane P (the object plane on which the document 12 to be reproduced is placed), the position of the plane P being selected so as to coincide with the other focus of the ellipse 38 (FIG. 5). The elliptical shape of the reflector 30 thus causes the light rays emitted from one of the focuses (the light source 28) to be concentrated on the other focus (the strip of light 36) situated in the plane P to be illuminated.

Since the mirror is constituted by a portion of an elliptical cylinder, it has no curvature parallel to the direction of its generator line, such that no focusing takes place along this axis and the result is therefore a narrow strip of light on the plane of the document to be input.

In order to obtain a narrow strip of light, it is necessary to have a point light source 28 at the focus of the ellipse, or at least a light source in the form of a line, and it must be associated with a high quality elliptical optical system. Various types of lamp can be used that have a light-emitting region in the form of a point or a line, such as halogen, xenon, etc. lamps. Xenon lamps have a very small light-emitting region but they are difficult to use, and above all they are expensive given the equipment required. In contrast, linear filament halogen lamps are much easier to use and benefit from being much more wide-spread because of their consumer applications. They have filaments that are wound as a single or double coil such that the light-emitting diameter is about 2 mm in practice, which in association with the above-described optical system used produces a light strip in the object plane that is about 5 centimeters (cm) to 8 cm wide.

In order to accommodate tracking errors in the servo-control, it is in fact advantageous for the width of the light strip to be considerably wider than the width of the line being scanned by the camera. However, in practice, it has been found that a width of about 1 cm is quite wide enough, and this can be obtained using special halogen lamps in which the filament is not coiled but is constituted by a simple tungsten wire having a diameter of 0.1 mm to 0.5 mm and that is tensioned over a suitable length, typically 5 cm to 15 cm. This makes it possible on the scan line and on either side thereof to obtain the same brightness as can be obtained with a lamp whose filament is single- or double-coiled, but with electricity consumption that is much lower, being reduced by a factor lying in the range 4 to 10 or even more.

The light generator 20 made in this way constitutes a rectangular block having one of its large faces facing towards the surface to be illuminated.

Typically, the dimensions H (height) and L (width) of the opening of the reflector 30 are such that L>H, typically with values of the order L=15 cm to 60 cm and H=10 cm to 20 cm.

To enable the entire width of the working surface to be lighted more uniformly, it is preferable to use a plurality of such light generators, for example two groups of two lights each, as shown.

The camera 16 placed above the document 12 receives light rays 40 corresponding to the light strip 36, and by means of a suitable objective lens system 42 it forms an image of the object plane P on an image P'. The image plane P' is scanned using a charge-coupled device (CCD) 44 in the form of a strip extending parallel to the central axis of the light strip 36 and constituting a projection thereof. In order to obtain the desired resolution, it is possible, for example, to use a sensor strip having 12,000 pixels.

The photosensitive sensor 44 which scans a line in the image plane P' is itself swept regularly in a direction perpendicular to the long direction of the strip, thereby enabling it to cover the entire image plane. This sweeping motion as represented by arrows 46 is driven, for example, by a high-precision stepper motor, typically a motor that is controlled at 50,800 steps per revolution with transmission via a ball-screw with prestressing to take up slack. This technique makes it possible to achieve mechanical precision of 1 micron ($\mu$m) that is entirely compatible with the precision required for obtaining the desired resolution in the image plane P' which is about 6 $\mu$m (corresponding to about 0.1 mm in the object plane P for a 1300 mm×2167 mm document).

Movement of the photosensor 44 over the image plane P' is synchronized with movement of the light strip 36 over the object plane P. Movement of the strip of light is provided by motors driving the light generators 20, as represented by arrows 48 in FIG. 2.

In order to ensure that the light strip 36 coincides automatically with the line being scanned by the photosensor 44, it is possible to make use of various kinds of servo-control, such as:

mechanical servo-control: a cams and linkage system associates the positions of the light generators with the position of the sensor;

electronic servo-control: since the position of the sensor is known at all times to the software controlling the motor, this information is used as a basis for computations that control the motors driving the light generators; and optoelectronic servo-control: a laser beam is generated, e.g. inside the camera at the end of the moving strip of the sensor 44, which beam is projected onto the document 12 (it is also possible to envisage other configurations in which the laser beam does not necessarily pass through the image-forming optical system). The position of the laser beam thus marks the exact position on the document, but does so outside the frame of the scan line inside the camera, and it is used as a reference for an optoelectronic device for measuring distances offset to issue control signals on a continuous basis to the light generators in order to enable them to correct the directions in which they point.

The light strip 36 is thus caused to move as represented by arrows 50 synchronously with the movement of the sensor 44 as represented by the arrows 46.

It will be observed that relative to the document to be input, the scan line (corresponding to the pixel width of the sensor 44 perpendicularly to the long direction of the strip of pixels) is extremely narrow. It would be very difficult for the lighting equipment to track such a scan line if the light strip 36 were too narrow. However, unless reflectors of very large dimensions are used, the width of the light strip is constrained to remain of the order of a few centimeters, i.e. tens of times greater than that which is strictly necessary. In present circumstances, this constitutes an advantage even if greater concentration would make it possible to save on light power: tracking is made easier because less accuracy is required; in addition, since a broader zone is illuminated, departures of the document from being completely plane are of no consequence, thus making it possible even to input articles of the low-relief type.

In order to acquire a color image, it is possible to insert a filter 52 inside the camera 16 on the path of the light rays, and to perform three sweeeps in order to obtain trichromatic input in yellow, magenta, and cyan (YMC) or in red, green, and blue (RGB), the filter being changed between sweeps, under automatic control of the controlling software. The number of passes can be increased if finer color analysis is useful or necessary, for example six successive passes can be performed using R, G, B, Y, M, and C filters in that order or in some other order for hexachromatic scanning.

What is claimed is:

1. Document scanning apparatus (10) in which a document (12) is placed on a plane support (14) defining an object plane (P), and including a camera (16) situated at a distance from the document, the camera including an objective lens system (42) forming an image of the document on an image plane (P'), and the apparatus being characterized in that:

the camera includes a photosensitive sensor (44) for scanning a line of the image plane in a first direction;

the camera includes first motor means adapted to move (46) the sensor in controlled manner in a second direction that is distinct from the first, so as to sweep over the surface of the image plane in said second direction;

at least one light generator (20) is provided that is suitable for forming a narrow strip of light (36) in the object plane and extending parallel to said first direction;

the light generator includes second motor means suitable for displacing (50) the light strip in controlled manner so as to sweep over the surface of the object plane parallel to said second direction; and servo-control means are provided for providing servo-control between the first and second motor means to keep the scan line in the image plane in correspondence with the light strip in the object plane.

2. The apparatus of claim 1, in which the line generator (20) comprises a linear light source (28) and a reflector (30) in the form of a portion of an elliptical cylinder, said cylinder being defined by a director line parallel to the linear light source and by an elliptical generatrix having one of its focuses situated at the linear light source and its other focus situated in the object plane.

3. The apparatus of claim 1, in which the servo-control means are cam and linkage mechanical means associating the position of the light generator with the position of the sensor.

4. The apparatus of claim 1, in which the servo-control means are electronic means comprising means for determining the instantaneous position of the sensor and means for driving said second motor means in such a manner as to associate the position of the light generator with that of the sensor.

5. The apparatus of claim 1, in which the servo-control means are optoelectronic means comprising means that are movable synchronously with the sensor to generate a laser beam and to project said beam on the object plane in the vicinity of the document, with distance-measuring means monitoring the respective positions of the spot formed by the beam on the object plane and the light strip and driving said second motor means in such a manner as to cause the position of the light generator to be associated with the position of the sensor.

* * * * *